United States Patent
Miyamoto

(10) Patent No.: US 10,717,146 B2
(45) Date of Patent: Jul. 21, 2020

(54) DISSIMILAR MATERIAL JOINED BODY AND DISSIMILAR MATERIAL JOINING METHOD

(71) Applicant: HONDA MOTOR CO., LTD, Minato-ku, Tokyo (JP)

(72) Inventor: Kazuki Miyamoto, Tochigi-ken (JP)

(73) Assignee: HONDA MOTOR CO., LTD., Tokyo (JP)

(*) Notice: Subject to any disclaimer, the term of this patent is extended or adjusted under 35 U.S.C. 154(b) by 180 days.

(21) Appl. No.: 15/702,945

(22) Filed: Sep. 13, 2017

(65) Prior Publication Data
US 2018/0079025 A1    Mar. 22, 2018

(30) Foreign Application Priority Data
Sep. 16, 2016    (JP) .................... 2016-181146

(51) Int. Cl.
| B32B 3/24  | (2006.01) |
| B23K 11/20 | (2006.01) |
| B23K 11/34 | (2006.01) |
| B23K 11/11 | (2006.01) |
| B32B 3/26  | (2006.01) |

(Continued)

(52) U.S. Cl.
CPC .............. B23K 11/20 (2013.01); B23K 11/115 (2013.01); B23K 11/34 (2013.01); B32B 3/266 (2013.01); B32B 3/30 (2013.01); B32B 7/02 (2013.01); B23K 2103/08 (2018.08); B23K 2103/18 (2018.08); B32B 37/144 (2013.01); B32B 38/04 (2013.01); B32B 2038/042 (2013.01); B32B 2307/30 (2013.01); B32B 2311/00 (2013.01); Y10T 428/24339 (2015.01)

(58) Field of Classification Search
CPC .................. Y10T 428/24339; B32B 3/266
See application file for complete search history.

(56) References Cited

U.S. PATENT DOCUMENTS

2014/0079908 A1* 3/2014 Kato ..................... B32B 3/06
                                                          428/140
2017/0361540 A1* 12/2017 Li ........................ B23K 20/22

FOREIGN PATENT DOCUMENTS

| JP | 2005-021946 | 1/2005  |
| JP | 2010-240678 | 10/2010 |
| JP | 2016-059954 | 4/2016  |

OTHER PUBLICATIONS

Japanese Office Action for Japanese Patent Application No. 2016-181146 dated Dec. 26, 2017.

* cited by examiner

*Primary Examiner* — William P Watkins, III
(74) *Attorney, Agent, or Firm* — Amin, Turocy & Watson, LLP

(57) ABSTRACT

A dissimilar material joined body is obtained by subjecting to electrical energizing under pressure and joining with electrodes a laminated member, which is of a structure in which a first plate-shaped part and a second plate-shaped part having a higher melting point than that of the first plate-shaped part are superimposed on each other. A concave portion having a shape corresponding to the outer shape of an electrode is formed on the surface of the first plate-shaped part on a side thereof opposite to the second plate-shaped part. The first plate-shaped part includes protrusions, which are inserted into through holes formed in the second plate-shaped part. A method of joining dissimilar materials includes a hole forming step, a stacking step, a pressure energizing step, and a solidification step.

12 Claims, 8 Drawing Sheets

(51) Int. Cl.
  *B32B 3/30*   (2006.01)
  *B32B 7/02*   (2019.01)
  *B32B 38/04*   (2006.01)
  *B32B 37/14*   (2006.01)
  *B23K 103/18*  (2006.01)
  *B23K 103/08*  (2006.01)

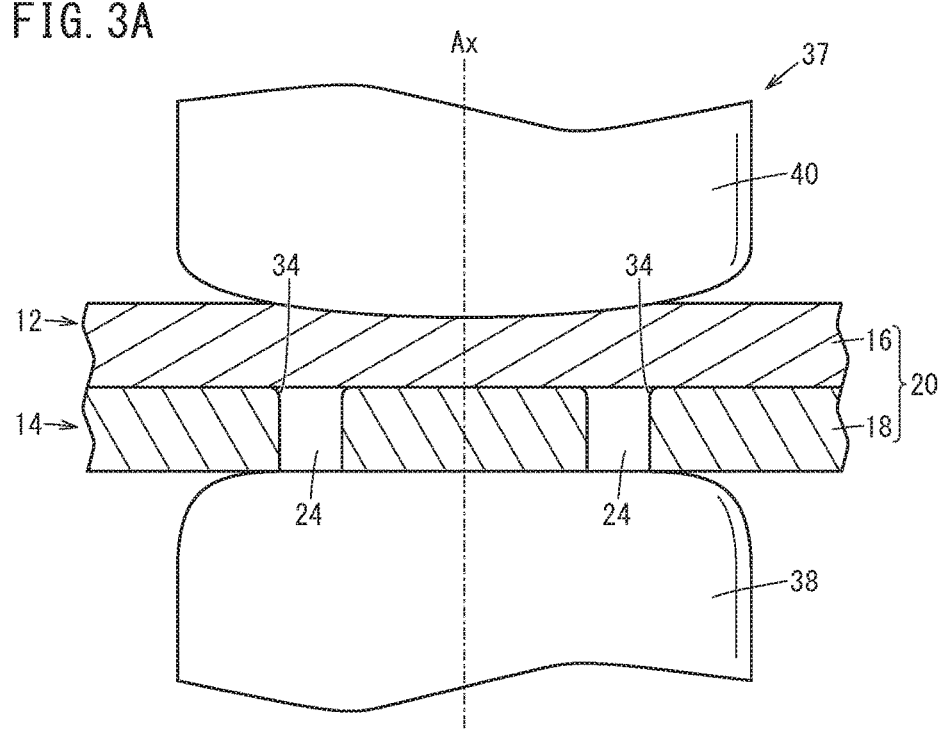
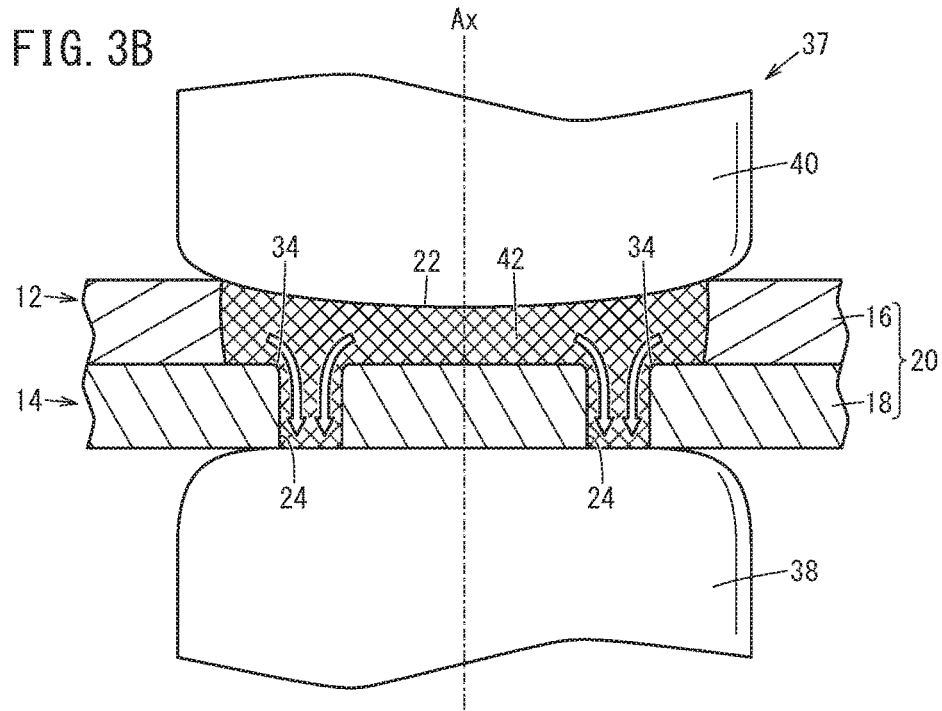

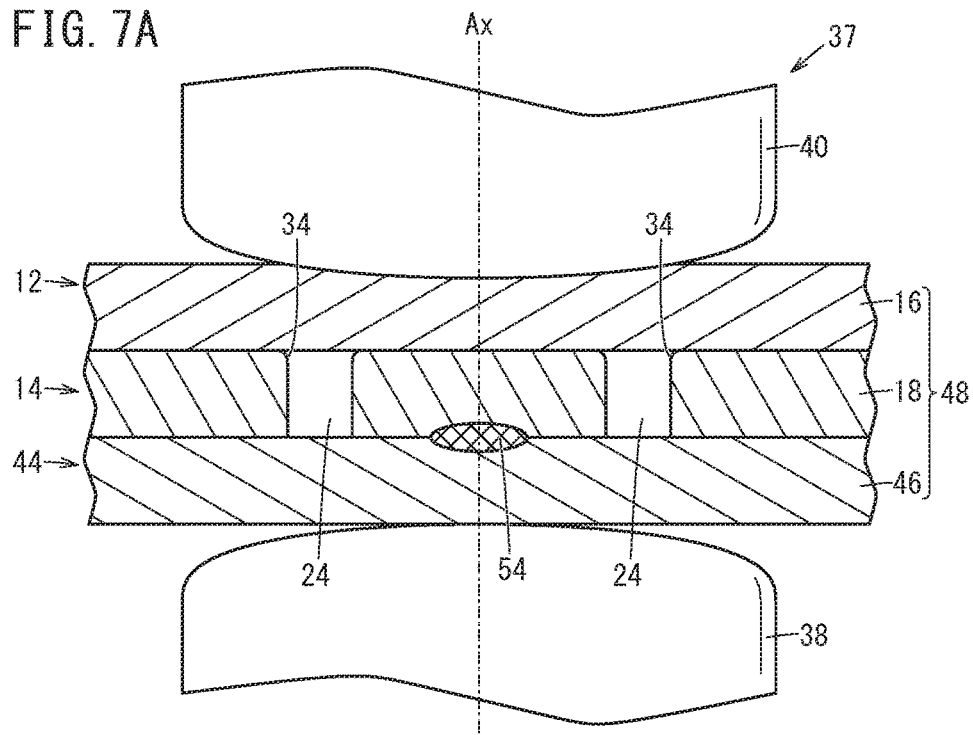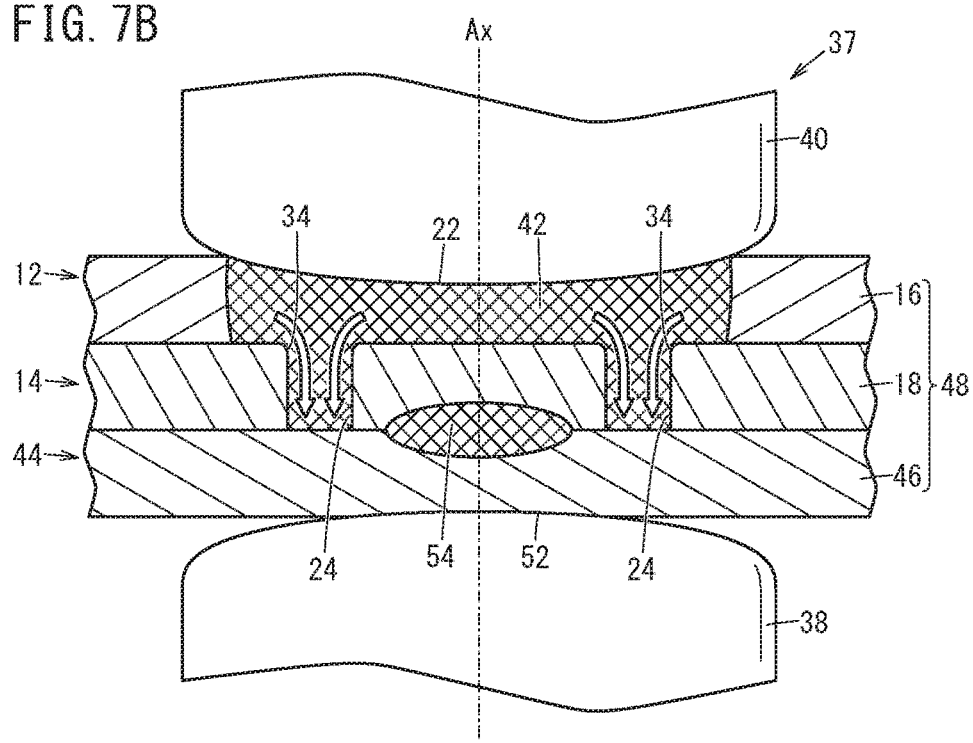

DISSIMILAR MATERIAL JOINED BODY AND DISSIMILAR MATERIAL JOINING METHOD

CROSS-REFERENCE TO RELATED APPLICATION

This application is based upon and claims the benefit of priority from Japanese Patent Application No. 2016-181146 filed on Sep. 16, 2016, the contents of which are incorporated herein by reference.

BACKGROUND OF THE INVENTION

Field of the Invention

The present invention relates to a dissimilar material joined body, which is formed by subjecting to electrical energizing under pressure with electrodes and thereby joining a laminated body in which a plurality of plate-shaped parts composed of mutually different materials are superimposed on each other. The present invention also relates to a method of joining such dissimilar materials.

Description of the Related Art

For example, in Japanese Laid-Open Patent Publication No. 2005-021946, a dissimilar material joining method is disclosed, in which a mesh-shaped thin plate made of an iron-based metal is interposed between a first member made of aluminum and a second member made of an iron-based metal, and such members are joined together mutually by applying pulsed electricity to the members in a furnace.

SUMMARY OF THE INVENTION

However, with the above-described conventional technology, since it is necessary to apply pulsed electricity to the members to be joined (workpieces) in a furnace, the joining apparatus becomes large in scale, and a large number of joining steps are required. Further, in order to make the joining apparatus smaller in scale and to reduce the number of joining steps, preferably, the dissimilar materials are joined to each other using a joining machine equipped with electrodes for applying electrical energy under pressure, such as a spot joining machine or a roller seam joining machine.

The present invention has been devised in consideration of the aforementioned problems, and has the object of providing a dissimilar material joined body and a dissimilar material joining method, which enable different materials to be joined to each other securely using a joining machine equipped with electrodes for applying electrical energy under pressure.

For achieving the above-described object, a dissimilar material joined body according to the present invention is obtained by subjecting to electrical energizing under pressure with electrodes and thereby joining a laminated member including a structure in which a first plate-shaped part and a second plate-shaped part having a higher melting point than the first plate-shaped part are superimposed on each other, wherein a concave portion having a shape corresponding to an outer shape of the electrode is formed on a surface of the first plate-shaped part on a side thereof opposite to the second plate-shaped part, a through hole is formed in the second plate-shaped part, and the first plate-shaped part includes a protrusion, which is inserted into the through hole.

In the above-described dissimilar material joined body, a plurality of the through holes may be disposed at positions overlapping with the concave portion as viewed in plan from a stacking direction of the laminated member, and a plurality of the protrusions may be provided which are inserted into the respective through holes.

In accordance with such a structure, the bonding strength between the first plate-shaped part and the second plate-shaped part can be enhanced. In particular, it is possible to effectively improve the bonding strength in a direction of rotation about the protrusions.

In the above-described dissimilar material joined body, the plurality of through holes may be arranged in a manner so that center lines of the through holes are positioned at respective vertices of a polygon as viewed in plan.

In accordance with such a structure, it is possible to effectively improve the bonding strength of the dissimilar materials.

In the above-described dissimilar material joined body, the laminated member may be formed by superimposing a third plate-shaped part having a higher melting point than that of the first plate-shaped part on the second plate-shaped part on a side thereof opposite to the first plate-shaped part, a nugget may be formed between the second plate-shaped part and the third plate-shaped part, and the through hole may be formed in the second plate-shaped part at a position offset with respect to a center of the nugget, in a planar direction perpendicular to the stacking direction of the laminated member.

In accordance with such a structure, the first plate-shaped part, the second plate-shaped part, and the third plate-shaped part can be joined to each other reliably using a joining machine equipped with electrodes for applying electrical energy under pressure.

In the above-described dissimilar material joined body, the plurality of through holes may be disposed at positions overlapping with the concave portion as viewed in plan from the stacking direction of the laminated member, in a manner so that center lines of the through holes are positioned at respective vertices of a polygon, a plurality of the protrusions may be provided which are inserted into the respective through holes, and the center of the nugget may be positioned inside of the polygon as viewed in plan.

In accordance with such a structure, since the through holes and the protrusions are provided in plurality, it is possible to effectively improve the bonding strength between the first plate-shaped part and the second plate-shaped part. Further, since the center of the nugget is positioned inside of the polygon as viewed in plan, when subjected to electrical energizing, it is possible to suppress variations in the amount of heat transferred from the nugget to each of the through holes. Consequently, since it is possible for the formation conditions of the respective protrusions to be substantially the same, the bonding strength between the first plate-shaped part and the second plate-shaped part can be enhanced more effectively.

In the above-described dissimilar material joined body, a curved surface may be formed in a root part of the protrusion, the curved surface being in contact with a sagging surface formed at an opening edge portion of the through hole.

In accordance with such a structure, it is possible to effectively increase the strength of the root part of the protrusion.

In the above-described dissimilar material joined body, the respective through holes may be positioned entirely inside of the concave portion, and the respective through holes may be arranged so as not to protrude to exterior of the concave portion.

In accordance with such a structure, the protrusions of the first plate-shaped part can be efficiently inserted into the through holes of the second plate-shaped part.

In the above-described dissimilar material joined body, the through hole may be reduced in diameter in a tapered shape toward a side opposite to a base section of the first plate-shaped part.

In accordance with such a structure, the protrusions of the first plate-shaped part can be inserted reliably into the through hole of the second plate-shaped part.

In the above-described dissimilar material joined body, the through hole may be reduced in diameter in a tapered shape toward a base section of the first plate-shaped part.

In accordance with such a structure, it is possible to effectively improve the bonding strength in the stacking direction of the laminated member.

A dissimilar material joining method according to the present invention subjects to electrical energizing under pressure with electrodes and thereby joins a laminated member in which a first plate-shaped part and a second plate-shaped part having a higher melting point than the first plate-shaped part are superimposed on each other, the method comprising a hole forming step of forming a through hole in the second plate-shaped part, a stacking step of, after the hole forming step, forming the laminated member by superimposing the first plate-shaped part and the second plate-shaped part mutually on each other, a pressure energizing step of, after the stacking step, electrically energizing the laminated member under pressure with the electrodes, whereby the first plate-shaped part is melted and flows into interior of the through hole, and a solidification step of stopping supply of electrical energy by the electrodes with respect to the laminated member, whereby the first plate-shaped part becomes solidified and forms a protrusion inside the through hole.

Further, a dissimilar material joining method according to the present invention subjects to electrical energizing under pressure with electrodes and thereby joins a laminated member in which a first plate-shaped part, a second plate-shaped part having a higher melting point than the first plate-shaped part, and a third plate-shaped part having a higher melting point than the first plate-shaped part are superimposed on each other, comprising a hole forming step of forming a through hole in the second plate-shaped part, a stacking step of, after the hole forming step, forming the laminated member by sequentially superimposing the first plate-shaped part, the second plate-shaped part, and the third plate-shaped part in this order, a pressure energizing step of, after the stacking step, electrically energizing the laminated member under pressure with the electrodes, in a manner so that an axis of the electrodes is offset with respect to the through hole in a planar direction perpendicular to the stacking direction of the laminated member, whereby the first plate-shaped part is melted and flows into interior of the through hole, and together therewith, a melted portion is formed between the second plate-shaped part and the third plate-shaped part, and a solidification step of stopping supply of electrical energy by the electrodes with respect to the laminated member, whereby the first plate-shaped part becomes solidified and forms a protrusion inside the through hole, and together therewith, the melted portion becomes solidified and forms a nugget.

In accordance with such a method, dissimilar materials (the first plate-shaped part and the second plate-shaped part) can be joined to each other reliably using a joining machine equipped with electrodes for applying electrical energy under pressure.

In the above-described dissimilar material joining method, the through hole may be formed by implementing a punching process with respect to the second plate-shaped part in the hole forming step, and in the stacking step, the first plate-shaped part may be superimposed on a side of the second plate-shaped part where a sagging surface is positioned, the sagging surface being formed by the hole forming step at an opening edge portion of the through hole.

In such a method, it is possible to prevent the first plate-shaped part from becoming damaged by burrs formed in the hole forming step at the opening edge portion of the through hole, coming into contact with the first plate-shaped part. Further, since the curved surface that contacts the sagging surface can be formed at the root part of the protrusion, it is possible to effectively increase the strength of the root part of the protrusion.

According to the present invention, since the protrusion of the first plate-shaped part is inserted into the through hole of the second plate-shaped part, dissimilar materials (the first plate-shaped part and the second plate-shaped part) can be joined to each other reliably using a joining machine equipped with electrodes for applying electrical energy under pressure.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 3A is a first cross-sectional view for describing a pressure energizing step of the dissimilar material joining method, and FIG. 3B is a second cross-sectional view for describing the pressure energizing step;

FIG. 7A is a first cross-sectional view for describing a pressure energizing step according to the second embodiment of the present invention, and FIG. 7B is a second cross-sectional view for describing the pressure energizing step.

DESCRIPTION OF THE PREFERRED EMBODIMENTS

Preferred embodiments of a dissimilar material joined body and a dissimilar material joining method according to the present invention will be described below with reference to the accompanying drawings.

First Embodiment

Figure 1A:
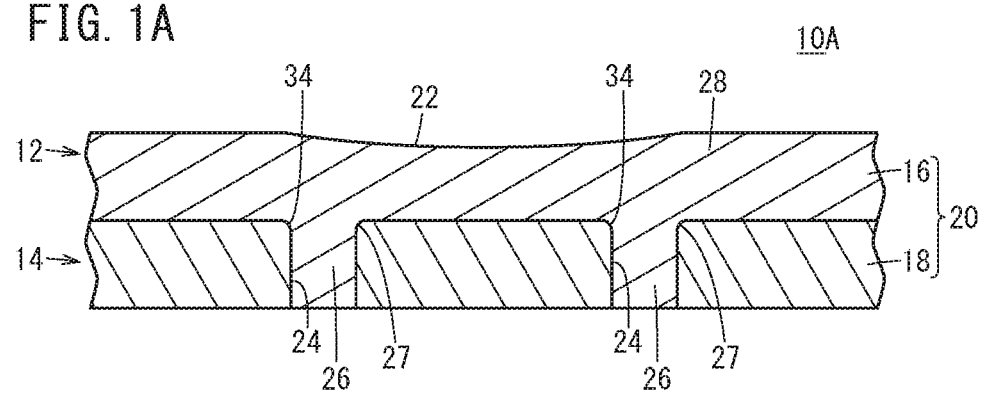
FIG. 1A is a cross-sectional view of a dissimilar material joined body according to a first embodiment of the present invention.

As shown in FIG. 1A, a dissimilar material joined body 10A according to a first embodiment of the present invention is used, for example, as a vehicle body panel of an automobile, and is obtained by applying electrical energy under pressure by way of a spot joining machine mutually to a first plate-shaped part 16 of a first member 12, and a second plate-shaped part 18 of a second member 14.

The first member 12 is constituted, for example, from aluminum or an aluminum alloy. The second member 14 is constituted from a material having a melting point higher than that of the first member 12, for example, an iron-based metal such as steel or the like. However, the constituent materials of the first member 12 and the second member 14, respectively, are not limited to the above examples. As such materials, there can be used, for example, titanium, a titanium alloy, magnesium, a magnesium alloy, an electrically conductive resin material such as carbon fiber reinforced plastic, and the like. In the case of using such materials, a material having a lower melting point is selected as the first member 12, and a material having a higher melting point is selected as the second member 14.

The first member 12 has the first plate-shaped part 16 formed by a thin plate portion. Any arbitrary shape can be adopted for portions of the first member 12 other than the first plate-shaped part 16. The second member 14 has the second plate-shaped part 18 formed by a thin plate portion. Any arbitrary shape can be adopted for portions of the second member 14 other than the second plate-shaped part 18. The first plate-shaped part 16 and the second plate-shaped part 18 are mutually superimposed on each other to thereby make up a laminated member 20.

Figure 1B:
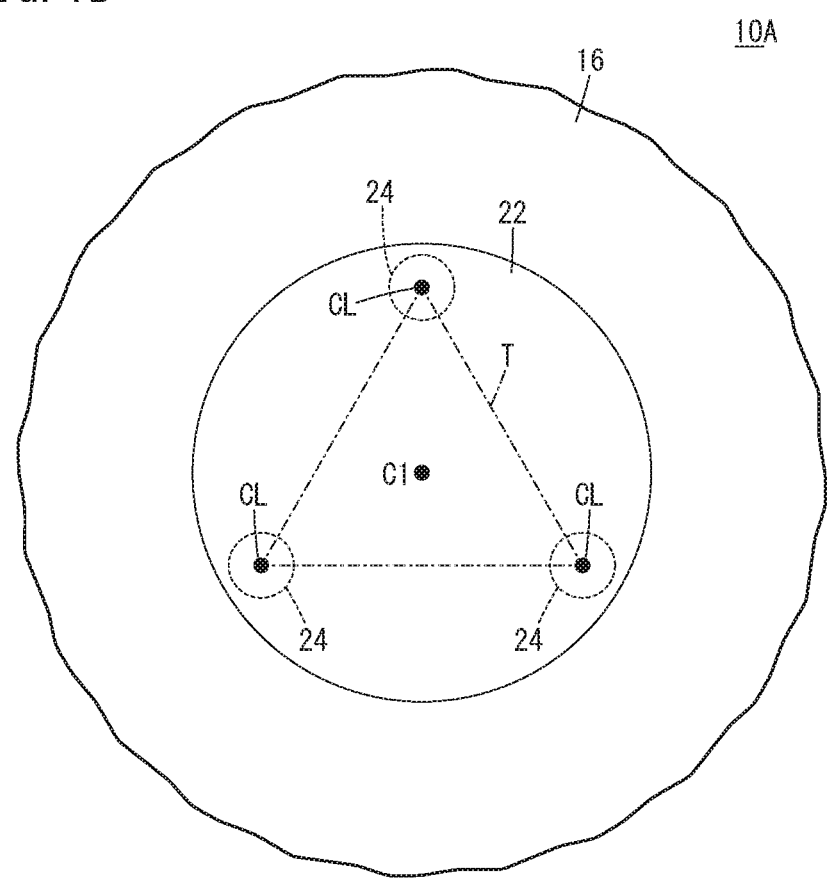
FIG. 1B is a plan view of FIG. 1A.

As shown in FIGS. 1A and 1B, on a surface of the first plate-shaped part 16 on an opposite side from the second plate-shaped part 18, a circular shaped concave portion 22 is formed, which provides an indentation for the electrode 40 (see FIG. 3B) of a spot joining machine 37. More specifically, the concave portion 22 has a shape corresponding to the outer shape of the electrode 40.

Three circular through holes 24 are formed in the second plate-shaped part 18, at positions overlapping with the concave portion 22 as viewed in plan in the stacking direction of the laminated member 20. More specifically, as viewed in plan, the respective through holes 24 are located entirely inside of the concave portion 22, and the through holes 24 do not protrude outside of the concave portion 22. The diameters of the respective through holes 24 preferably lie within a range, for example, of 10% to 40%, and more preferably, 20% to 30%, of the diameter of the concave portion 22. Assuming such a size, it is possible to reliably arrange the entirety of the respective through holes 24 inside of the concave portion 22.

Figure 2A:
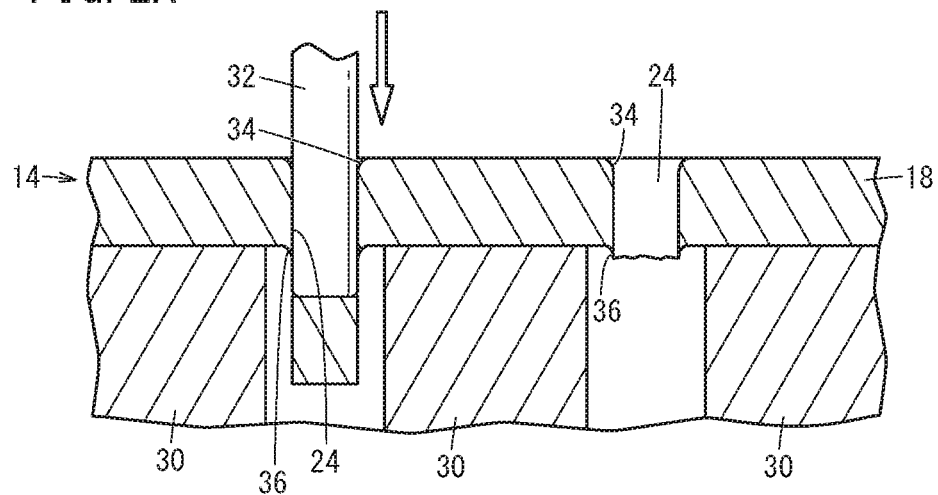
FIG. 2A is a cross-sectional view for describing a hole forming step of the dissimilar material joining method according to a first embodiment of the present invention.

On the opening edge portion of each of the through holes 24 on the side of the first plate-shaped part 16 (on the side of the concave portion 22), a sagging surface 34 having a rounded shape (R-shaped portion) is provided, which is formed by a punching process using a punch 32 when the hole forming step of the second plate-shaped part 18 is carried out (see FIG. 2A). The three through holes 24 are arranged such that center lines CL of the respective through holes 24 are positioned at respective vertices of an equilateral triangle T (polygon) as viewed in plan (see FIG. 1B). Further, the center lines CL of the respective through holes 24 are positioned at substantially the same distance from the center C1 (center of impact) of the concave portion 22.

The three through holes 24 may be arranged so that the center lines CL of the respective through holes 24 are located at the vertices of a triangle other than an equilateral triangle T, for example, an isosceles triangle or the like. The size, shape, and number of the through holes 24 can be changed arbitrarily. Stated otherwise, the through holes 24 may be formed in an elliptical shape or a polygonal shape. Further, the diameters of the through holes 24 may be less than 10% of the diameter of the concave portion 22, or may be greater than 40% of the diameter of the concave portion 22.

Furthermore, one, two, or four or more through holes 24 may be provided. In the case that four through holes 24 are provided, the through holes 24 are arranged so that the center lines CL of the respective through holes 24 are located at respective vertices of a square or rectangle. Stated otherwise, in the case that a number of through holes 24 other than three are provided, the through holes 24 are arranged so that the center lines CL of the respective through holes 24 are located at respective vertices of a polygon. Further still, portions of each of the through holes 24 may protrude outside of the concave portion 22 as viewed in plan. More specifically, at least a part of each of the through holes 24 may overlap with the concave portion 22 as viewed in plan.

The first plate-shaped part 16 has three protrusions 26 that are inserted into each of the through holes 24. More specifically, the respective protrusions 26 are convex parts that protrude from a base section 28 of the first plate-shaped part 16 in a direction opposite to that of the concave portion 22. Rounded curved (or R-shaped) surfaces 27, which are placed in contact with the sagging surfaces 34 of the second plate-shaped part 18, are formed at root parts of each of the protrusions 26. The respective protrusions 26 close the entirety of each of the through holes 24, and are placed in contact with wall surfaces that make up the through holes 24. However, the protrusions 26 may be formed so as to close only portions of each of the through holes 24.

The dissimilar material joined body 10A according to the present embodiment is basically constituted as described above. Next, a description will be giving concerning the dissimilar material joining method. The method of joining dissimilar materials of the present embodiment includes a hole forming step, a stacking step, a pressure energizing step, and a solidification step, which are performed sequentially.

As shown in FIG. 2A, in the hole forming step, a plurality of (three) through holes 24 are formed by subjecting the second plate-shaped part 18 to a punching process. More specifically, the through holes 24 are formed by punching with a punch 32, which serves as an upper die, against the second plate-shaped part 18 which is placed on a die 30 serving as a lower die. With the through holes 24 which are formed in this manner, a rounded (R-shaped) sagging surface 34 is formed at opening edge portions on an upper side in the punching direction of the punch 32, and burrs 36 are formed in the opening edge portions on a lower side in the punching direction of the punch 32.

Figure 2B:
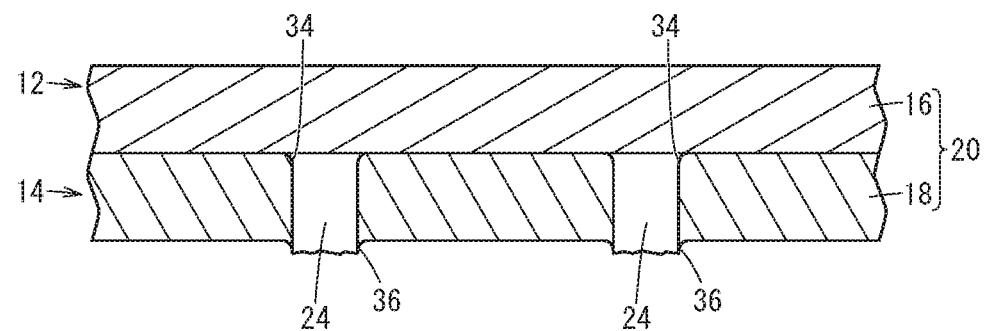
FIG. 2B is a cross-sectional view for describing a stacking step of the dissimilar material joining method.

As shown in FIG. 2B, in the stacking step, the laminated member 20 is formed by superimposing the first plate-shaped part 16 on the side where the sagging surfaces 34 of the second plate-shaped part 18 are located. In this case, it is possible to prevent the first plate-shaped part 16 from becoming damaged by the burrs 36.

As shown in FIG. 3A, in the pressure energizing step, the laminated member 20 is sandwiched and pressed from the stacking direction between two electrodes 38, 40 of the spot joining machine 37, which is a resistance welding machine. Stated otherwise, the two electrodes 38, 40 are pressed in directions to approach each other. At this time, the axis Ax of the respective electrodes 38, 40 is positioned in the center of the aforementioned equilateral triangle T, and the center lines CL of the respective through holes 24 are located at the vertices thereof. Further, the burrs 36 that are formed in the hole forming step of the second plate-shaped part 18 are removed by coming into contact with the electrode 38.

In addition, by supplying electric current to the electrodes 38, 40 on the basis of predetermined joining conditions, a non-illustrated control unit of the spot joining machine 37 supplies Joule heat to the laminated member 20. Upon doing so, as shown in FIG. 3B, the first plate-shaped part 16 is melted, and a melted portion 42 of the first plate-shaped part 16 is pressed by the electrode 40 into each of the through holes 24. More specifically, the melted portion 42 of the first plate-shaped part 16 flows into each of the through holes 24.

Subsequently, in the solidification step, the control unit stops the supply of current to the electrodes 38, 40. Upon doing so, the melted portion 42 of the first plate-shaped part 16 becomes solidified, and the protrusions 26 of the first plate-shaped part 16 are formed in each of the through holes 24 (see FIG. 1A). Consequently, the dissimilar material joined body 10A is formed. Thereafter, the control unit separates the electrodes 38, 40 away from the laminated member 20.

According to the present embodiment, since the protrusions 26 of the first plate-shaped part 16 are inserted into the through holes 24 of the second plate-shaped part 18, dissimilar materials (the first plate-shaped part 16 and the second plate-shaped part 18) can be joined to each other reliably using the spot joining machine 37 equipped with the electrodes 38, 40 for applying electrical energy under pressure.

Further, since the through holes 24 and the protrusions 26 are provided in plurality, it is possible to effectively improve the bonding strength between the first plate-shaped part 16 and the second plate-shaped part 18. In particular, it is possible to effectively improve the bonding strength in a direction of rotation about the protrusions 26.

Furthermore, since the plurality of through holes 24 are disposed so that the center lines CL of the respective through holes 24 are positioned at respective vertices of a polygon (the equilateral triangle T) as viewed in plan, It is possible to effectively improve the bonding strength between the first plate-shaped part 16 and the second plate-shaped part 18.

Further still, in the stacking step, the first plate-shaped part 16 is superimposed on a side where the sagging surfaces 34 of the second plate-shaped part 18 are located, the sagging surfaces 34 being formed in opening edge portions of the through holes 24 in the hole forming step. Therefore, it is possible to prevent the burrs 36 from coming into contact with the first plate-shaped part 16, and to prevent the first plate-shaped part 16 from becoming damaged.

Further, since the curved surfaces 27 that contact the sagging surfaces 34 can be formed at root parts of the respective protrusions 26, it is possible to effectively increase the strength of the root parts of the respective protrusions 26.

Furthermore, the respective through holes 24 are located entirely inside of the concave portion 22, and the through holes 24 do not protrude outside of the concave portion 22. Therefore, the protrusions 26 of the first plate-shaped part 16 can be efficiently inserted into the through holes 24 of the second plate-shaped part 18.

Figure 4A:
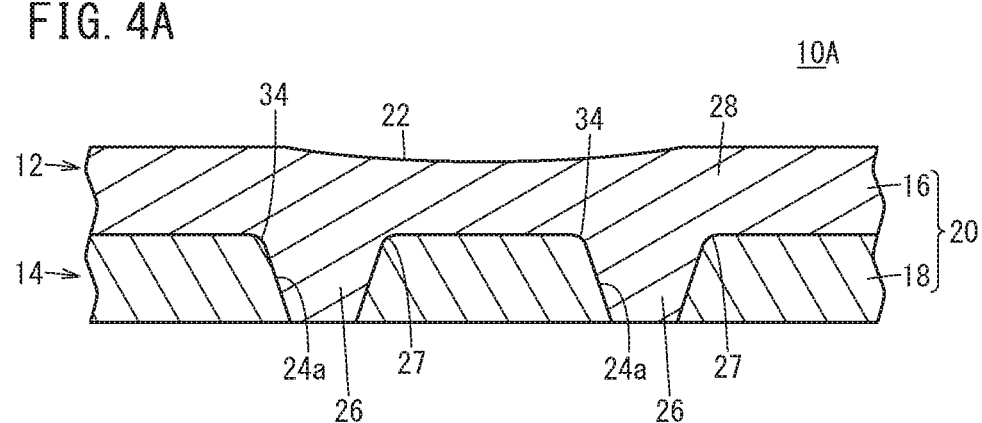
FIG. 4A is a cross-sectional view showing a first modified example of the dissimilar material joined body of FIG. 1A.

The present embodiment is not limited to the structures and method described above. For example, as shown in FIG. 4A, in the second plate-shaped part 18 of the dissimilar material joined body 10A, instead of the through holes 24, there may be formed a plurality of through holes 24a that are reduced in diameter in a tapered shape toward the side opposite to the base section 28 of the first plate-shaped part 16. In this case, in the pressure energizing step, it is possible for the melted portion 42 of the first plate-shaped part 16 to be made to flow easily into each of the through holes 24a.

Figure 4B:
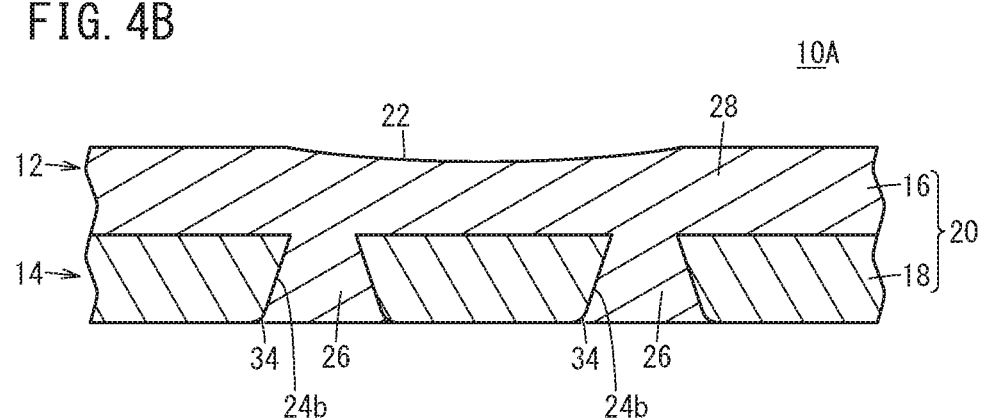
FIG. 4B is a cross sectional view showing a second modified example of the dissimilar material joined body of FIG. 1A.

Further, as shown in FIG. 4B, in the second plate-shaped part 18, instead of the through holes 24, there may be formed a plurality of through holes 24b that are reduced in diameter in a tapered shape toward the base section 28 of the first plate-shaped part 16. In this case, it is possible to effectively improve the bonding strength in the stacking direction of the laminated member 20.

Second Embodiment

Next, a dissimilar material joined body 10B and a dissimilar material joining method according to a second embodiment of the present invention will be described. In the dissimilar material joined body 10B according to the second embodiment, components thereof which are the same as those of the dissimilar material joined body 10A according to the first embodiment are denoted by the same reference numerals, and detailed description of such features is omitted.

Figure 5A:
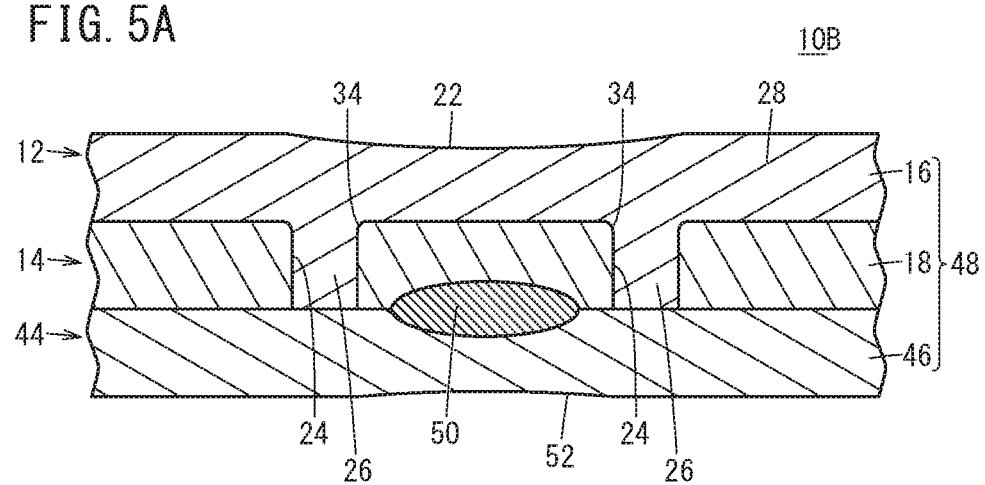
FIG. 5A is a cross-sectional view of a dissimilar material joined body according to a second embodiment of the present invention.

As shown in FIG. 5A, the dissimilar material joined body 10B is equipped with a first member 12, a second member 14, and a third member 44. The third member 44 is constituted from a material, for example, an iron-based metal such as steel or the like, having a melting point higher than that of the first member 12. According to the present embodiment, although the third member 44 is constituted from the same material as the second member 14, it may be constituted from a material that differs from that of the second member 14. However, the third member 44 is not limited to the examples described above. As such materials, there can be used, for example, titanium, a titanium alloy, magnesium, a magnesium alloy, an electrically conductive resin material such as carbon fiber reinforced plastic, and the like.

The third member 44 has a third plate-shaped part 46 formed by a thin plate portion. Any arbitrary shape can be adopted for portions of the third member 44 other than the third plate-shaped part 46. The first plate-shaped part 16, the second plate-shaped part 18, and the third plate-shaped part 46 are stacked in this order to thereby form a laminated member 48. More specifically, the third plate-shaped part 46 is superimposed on the second plate-shaped part 18 on a side thereof opposite to the first plate-shaped part 16.

Figure 5B:
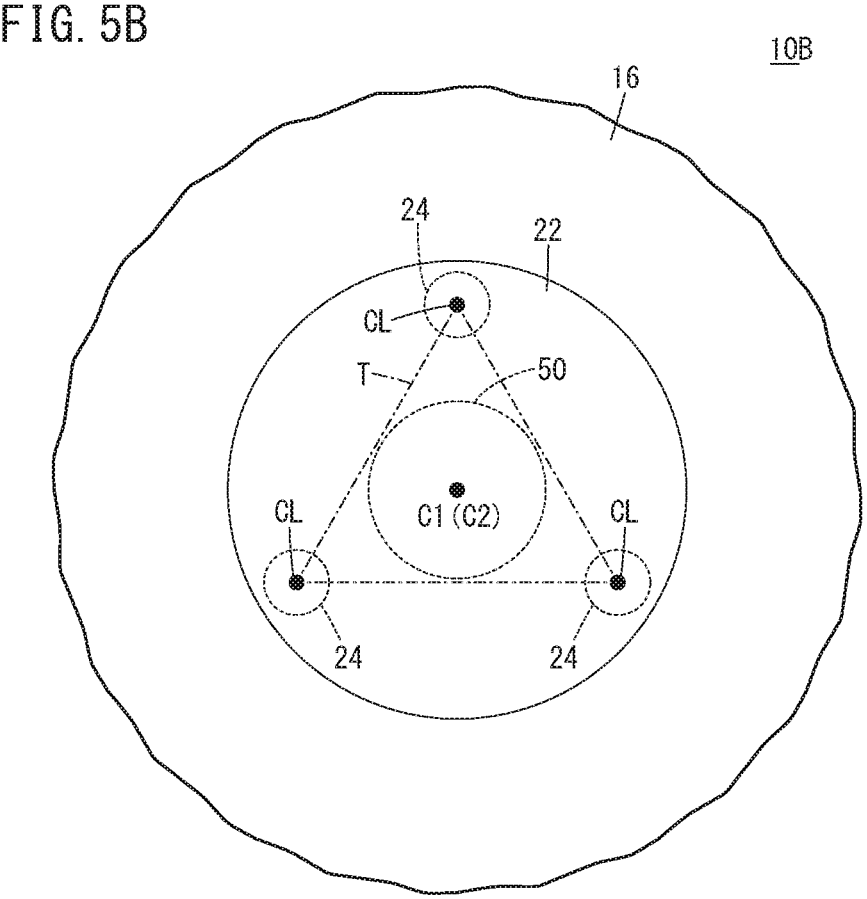
FIG. 5B is a plan view of FIG. 5A.

A nugget 50 is formed between the second plate-shaped part 18 and the third plate-shaped part 46. More specifically, the second plate-shaped part 18 and the third plate-shaped part 46 are welded together mutually by the nugget 50. As shown in FIGS. 5A and 5B, the nugget 50 is located inside of the above-described equilateral triangle T as viewed in plan, and preferably, does not protrude to the exterior of the equilateral triangle T. Stated otherwise, it is preferable for the center C2 of the nugget 50 to be positioned inside of the equilateral triangle T as viewed in plan.

On a surface of the third plate-shaped part 46 on an opposite side from the second plate-shaped part 18, a circular shaped concave portion 52 is formed, which provides an indentation for the electrode 38 (see FIG. 7B) of the spot joining machine 37. More specifically, the concave portion 52 has a shape corresponding to the outer shape of the electrode 38.

The dissimilar material joined body 10B according to the present embodiment is basically constituted as described above. Next, a description will be giving concerning the dissimilar material joining method. The method of joining dissimilar materials of the present embodiment includes a hole forming step, a stacking step, a pressure energizing step, and a solidification step, which are performed sequentially. Moreover, since the hole forming step is the same as the hole forming step according to the first embodiment shown in FIG. 2A, description of this feature is omitted.

Figure 6:
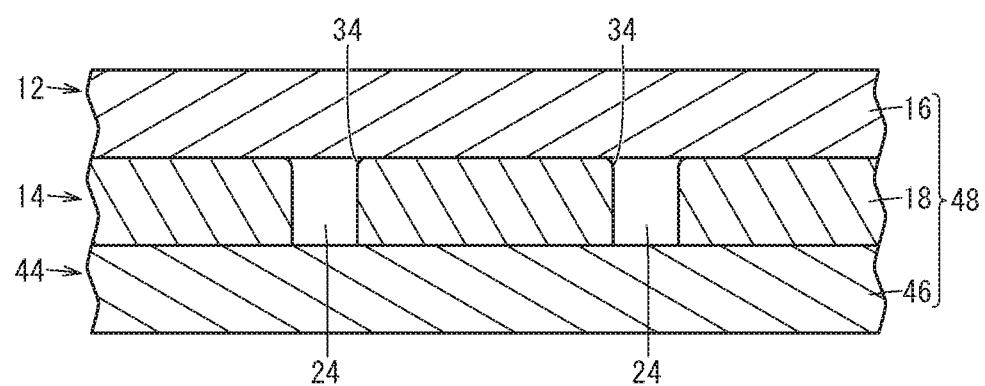
FIG. 6 is a cross-sectional view for describing the stacking step of the dissimilar material joining method according to the second embodiment of the present invention.

As shown in FIG. 6, in the stacking step, the laminated member 48 is formed by superimposing the first plate-shaped part 16, the second plate-shaped part 18, and the third plate-shaped part 46 sequentially in this order. At this time, the first plate-shaped part 16 is disposed on a side where the sagging surfaces 34 of the second plate-shaped part 18 are located, and the third plate-shaped part 46 is disposed on the second plate-shaped part 18 on an opposite side from the first plate-shaped part 16. Stated otherwise, the second plate-shaped part 18 is sandwiched between the first plate-shaped part 16 and the third plate-shaped part 46.

As shown in FIG. 7A, in the pressure energizing step, the laminated member 48 is sandwiched and pressed from the stacking direction between two electrodes 38, 40 of the spot joining machine 37. At this time, the axis Ax of the respective electrodes 38, 40 is positioned in the center of the aforementioned equilateral triangle T, and the center lines CL of the respective through holes 24 are located at the vertices thereof.

In addition, by supplying electric current to the electrodes 38, 40 on the basis of predetermined joining conditions, a non-illustrated control unit of the spot joining machine 37 supplies Joule heat to the laminated member 48. Upon doing so, as shown in FIG. 7B, the first plate-shaped part 16 is melted, and the melted portion 42 (hereinafter referred to as a first melted portion 42) of the first plate-shaped part 16 is pressed by the electrode 40 into each of the through holes 24. More specifically, the first melted portion 42 flows into each of the through holes 24. Further, a melted portion 54 (hereinafter referred to as a second melted portion 54), which is generated between the second plate-shaped part 18 and the third plate-shaped part 46, develops and grows.

Subsequently, in the solidification step, the control unit stops the supply of current to the electrodes 38, 40. Upon doing so, the first melted portion 42 becomes solidified, the protrusions 26 of the first plate-shaped part 16 are formed in each of the through holes 24, the second melted portion 54 is solidified, and the nugget 50 is formed between the second plate-shaped part 18 and the third plate-shaped part 46 (see FIG. 5A). Consequently, the dissimilar material joined body 10B is formed. Thereafter, the control unit separates the electrodes 38, 40 away from the laminated member 48.

The dissimilar material joined body 10B according to the present embodiment is obtained by subjecting to electrical energizing under pressure with the electrodes 38, 40 and thereby joining a laminated member 48, including a structure in which the first plate-shaped part 16, the second plate-shaped part 18 having a higher melting point than the first plate-shaped part 16, and the third plate-shaped part 46 having a higher melting point than the first plate-shaped part 16 are superimposed sequentially in order of the first plate-shaped part 16, the second plate-shaped part 18, and the third plate-shaped part 46. The concave portion 22 having a shape corresponding to the outer shape of the electrode 40 is formed on the surface of the first plate-shaped part 16 on a side thereof opposite to the second plate-shaped part 18, the nugget 50 is formed between the second plate-shaped part 18 and the third plate-shaped part 46, the through holes 24 are formed in the second plate-shaped part 18 at a position offset with respect to the center C2 of the nugget 50, in a planar direction perpendicular to the stacking direction of the laminated member 48, and the first plate-shaped part 16 includes the protrusions 26 which are inserted into the through holes 24.

According to the present embodiment, the same advantages and effects as those of the first embodiment are exhibited. Further, the first plate-shaped part, the second plate-shaped part, and the third plate-shaped part can be joined to each other reliably using a joining machine equipped with electrodes for applying electrical energy under pressure.

Furthermore, since the center C2 of the nugget 50 is positioned inside of the equilateral triangle T (polygon) as viewed in plan, when subjected to electrical energizing, it is possible to suppress variations in the amount of heat transferred from the nugget 50 to each of the through holes 24. Consequently, since it is possible for the formation conditions of the respective protrusions 26 to be substantially the same, the bonding strength between the first plate-shaped part 16 and the second plate-shaped part 18 can be enhanced more effectively.

Figure 8A:
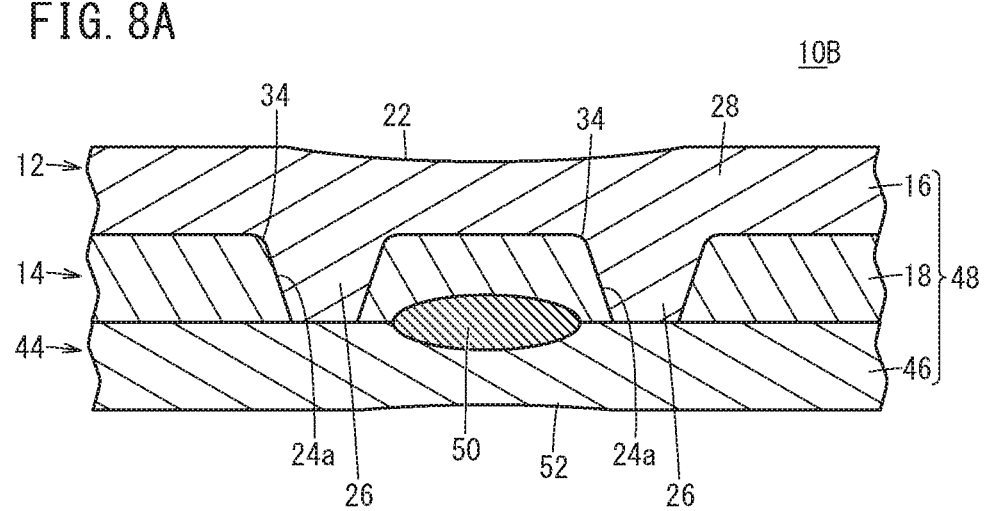
FIG. 8A is a cross-sectional view showing a first modified example of the dissimilar material joined body of FIG. 5A.

The present embodiment is not limited to the structures and method described above. For example, as shown in FIG. 8A, in the second plate-shaped part 18 of the dissimilar material joined body 10B, instead of the through holes 24, there may be formed a plurality of through holes 24a that are reduced in diameter in a tapered shape toward the side opposite to the base section 28 of the first plate-shaped part 16. In this case, in the pressure energizing step, it is possible for the melted portion 42 of the first plate-shaped part 16 to be made to flow easily into each of the through holes 24a.

Figure 8B:
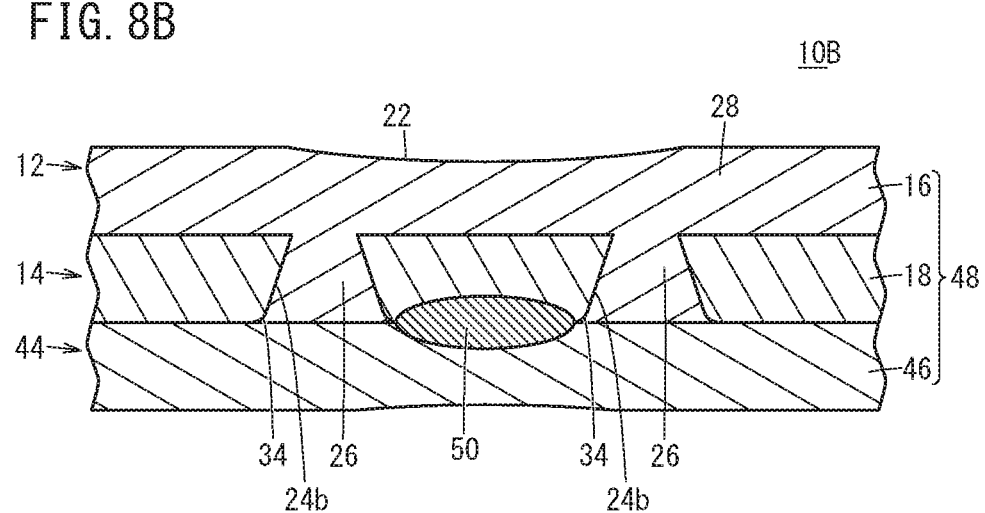
FIG. 8B is a cross-sectional view showing a second modified example of the dissimilar material joined body of FIG. 5A.

Further, as shown in FIG. 8B, in the second plate-shaped part 18, instead of the through holes 24, there may be formed a plurality of through holes 24b that are reduced in diameter in a tapered shape toward the base section 28 of the first plate-shaped part 16. In this case, it is possible to effectively improve the bonding strength in the stacking direction of the laminated member 48.

In the first embodiment and the second embodiment which were described above, it is preferable for the spot joining machine 37 to be a two-sided spot joining machine, of a type in which the laminated members 20, 48 are sandwiched and gripped between the two electrodes 38, 40. However, the spot joining machine 37 may be a one-sided spot joining machine, of a type in which electrodes are provided only on the side of the first plate-shaped part 16. Further, the dissimilar material joined body may be obtained by joining the laminated members 20, 48 using a roller seam joining machine equipped with roller electrodes for electrically energizing the laminated members 20, 48 under pressure.

The dissimilar material joined body and the dissimilar material joining method according to the present invention are not limited to the embodiments described above, and it is a matter of course that various modified or additional configurations could be adopted therein without departing from the essence and gist of the present invention.

What is claimed is:

1. A dissimilar material joined body, which is obtained by subjecting to electrical energizing under pressure with electrodes and thereby joining a laminated member including a structure in which a first plate-shaped part and a second plate-shaped part having a higher melting point than that of the first plate-shaped part are superimposed on each other, wherein:
   a concave portion having a shape corresponding to an outer shape of the electrode is formed on a surface of the first plate-shaped part on a side thereof opposite to the second plate-shaped part;
   a plurality of through holes are formed in the second plate-shaped part at positions overlapping with the concave portion as viewed in plan from a stacking direction of the laminated member; and
   the first plate-shaped part includes a plurality of protrusions, which are inserted into the respective through holes.

2. The dissimilar material joined body according to claim 1, wherein the plurality of through holes are arranged in a manner so that center lines of the through holes are positioned at respective vertices of a polygon as viewed in plan.

3. The dissimilar material joined body according to claim 1, wherein a curved surface is formed in a root part of the plurality of protrusions, the curved surface being in contact with a sagging surface formed at an opening edge portion of the through holes.

4. The dissimilar material joined body according to claim 1, wherein the respective through holes are positioned entirely inside of the concave portion, and the respective through holes do not protrude to exterior of the concave portion.

5. The dissimilar material joined body according to claim 1, wherein the through holes are reduced in diameter in a tapered shape toward a side opposite to a base section of the first plate-shaped part.

6. The dissimilar material joined body according to claim 1, wherein the through holes are reduced in diameter in a tapered shape toward a base section of the first plate-shaped part.

7. The dissimilar material joined body according to claim 1, wherein;
   the laminated member is formed by superimposing a third plate-shaped part having a higher melting point than that of the first plate-shaped part on the second plate-shaped part on a side thereof opposite to the first plate-shaped part;
   a nugget is formed between the second plate-shaped part and the third plate-shaped part; and
   the through hole is formed in the second plate-shaped part at a position offset with respect to a center of the nugget, in a planar direction perpendicular to the stacking direction of the laminated member.

8. The dissimilar material joined body according to claim 7, wherein:
   the plurality of through holes are disposed at positions overlapping with the concave portion as viewed in plan from the stacking direction of the laminated member, in a manner so that center lines of the through holes are positioned at respective vertices of a polygon;
   a plurality of the protrusions are provided which are inserted into the respective through holes; and
   the center of the nugget is positioned inside of the polygon as viewed in plan.

9. The dissimilar material joined body according to claim 7, wherein a curved surface is formed in a root part of the protrusion, the curved surface being in contact with a sagging surface formed at an opening edge portion of the through holes.

10. The dissimilar material joined body according to claim 8, wherein the respective through holes are positioned entirely inside of the concave portion, and the respective through holes do not protrude to exterior of the concave portion.

11. The dissimilar material joined body according to claim 7, wherein the through holes are reduced in diameter in a tapered shape toward a side opposite to a base section of the first plate-shaped part.

12. The dissimilar material joined body according to claim 7, wherein the through holes are reduced in diameter in a tapered shape toward a base section of the first plate-shaped part.

* * * * *